Patented Aug. 18, 1953

2,649,438

UNITED STATES PATENT OFFICE 2,649,438

COPOLYMERS OF ACRYLONITRILE AND BASIC ACRYLAMIDES

Herman A. Bruson, Shaker Heights, Ohio, assignor to Industrial Rayon Corporation, Cleveland, Ohio, a corporation of Delaware No Drawing. Application October 28, 1950, Serial No. 192,829

2 Claims. (Cl. 260—85.5)

This invention relates to the preparation of acrylonitrile polymer materials and to the shaped articles formed therefrom such as, for example, fibers, films and the like, hereinafter referred to as fibers. More particularly, this invention is concerned with orientable fibers made from such polymeric materials and having improved dyeing properties.

It is generally recognized in the art that homopolymers and most copolymers of acrylonitrile which are adaptable to the preparation of fibers, possess poor affinity for acid dyes. Such is the situation, for example, with fibers made from acrylonitrile copolymers with vinyl compounds of the type such as vinyl chloride, vinyl acetate, acrylic and methacrylic acids or esters, styrene and vinyl ethers and the like. Similarly, fibers made from copolymers of acrylonitrile with acrylamide, methacrylamide and various acylated acrylamides (U. S. Patent No. 2,478,378) show only a very feeble affinity for acid dyestuffs.

It has now been found that copolymer compositions of acrylonitrile and certain basic acrylamides or salts thereof, may be prepared, which compositions are particularly adapted to the formation of molecularly oriented shaped articles possessing a very high affinity for acid dyestuffs.

In accordance with the present invention, new fiber-forming polymeric materials, are prepared by polymerizing a mixture comprising acrylonitrile and a water-soluble sulfuric acid salt of N-morpholinoethyl acrylamide. The basic acrylamides which may also be employed generally have the formula

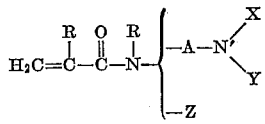

wherein R is a member of the group consisting of hydrogen and alkyl radicals having not more than two carbon atoms; A is a member of the group consisting of alkylene radicals having at least two carbon atoms and arylene radicals; N' is a tertiary nitrogen atom; X and Y taken singly are members of the group consisting of alkyl, hydroxyalkyl, cyanoalkyl, cycloalkyl, aralkyl and aryl radicals; X and Y taken jointly form a divalent radical, which radical forms a heterocycle with the N' atom; and Z is a member of the group consisting of substituted and unsubstituted pyridyl radicals, the amide nitrogen atom being linked to Z by a pyridyl ring carbon atom. The percentage of acrylonitrile in the polymer molecule is at least about 85% by weight and the percentage of the basic acrylamide compound is between about 2 and 10% by weight.

Typical basic acrylamides useful for the purpose of this invention are, for example, the following:

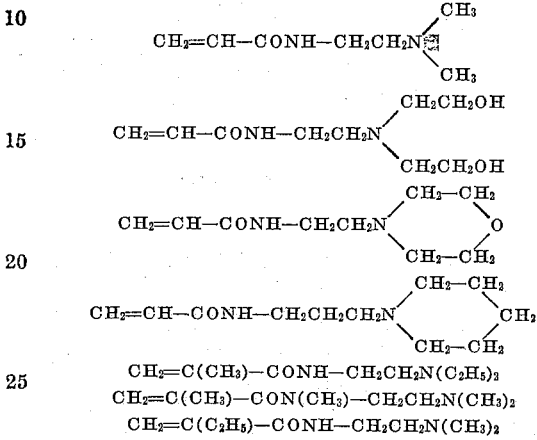

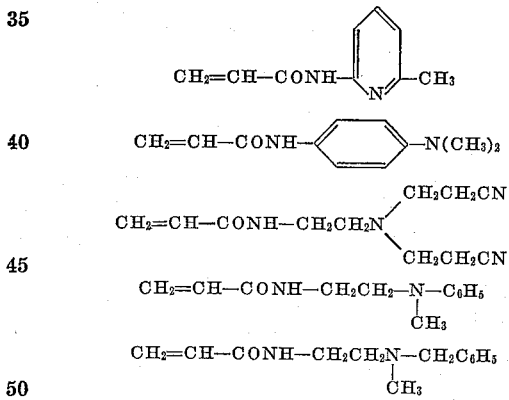

The basic acrylamides used as the comonomers of this invention are all new compounds. The alpha-unsubstituted basic acrylamides can be prepared by reacting beta-propiolactone with the desired tertiary amino diamine and distilling the product under reduced pressure whereby dehydration readily occurs, e. g.:

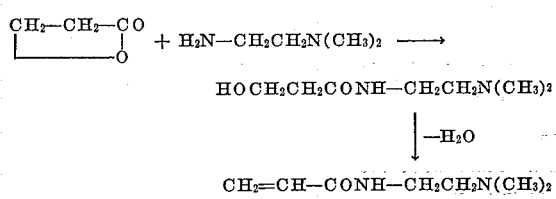

The others can be obtained by reacting the appropriate acrylyl chloride with the desired tertiary amino diamine, e. g., with $$HN(R)—A—N'X(Y)$$

or with $HN(R)—Z$ as generally illustrated below:

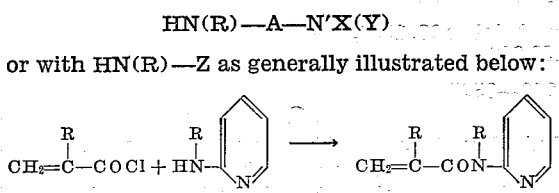

As previously stated, the copolymers of the present invention contain at least about 85% by weight of acrylonitrile in the polymer molecule. However, in preparing a copolymer for the production of fibers of the highest quality, it is advantageous to employ copolymerizable mixtures containing about 95% by weight of acrylonitrile and about 5% of one of the lower molecular weight tertiary amino substituted acrylamides such as, for example, $CH_2=CH—CONH—CH_2CH_2N(CH_3)_2$

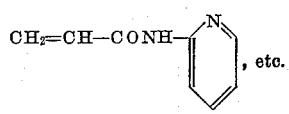
, etc.

Copolymers such as these, containing minimum proportions of the basic acrylamides, i. e., between about 2 and 5% by weight in the polymer molecule, are particularly advantageous in that they have excellent affinity for acid dyestuffs and also have optimum yarn physical properties.

Instead of employing the basic acrylamide monomers in the form of their free bases, it is often more advantageous to use them in the form of their water-soluble, stable salts with inorganic or organic acids. Typical of these salts are those obtained by treatment of the basic acrylamides with inorganic acids such as aqueous hydrochloric, sulfuric, nitric, phosphoric or boric acids, or organic acids such as formic, acetic, glycolic, lactic, crotonic, maleic, tartaric, citric, acrylic, chloroacetic, fumaric, oxalic, or other acids. It is advantageous to carry out the copolymerization of the acrylonitrile with such stable, water-soluble salts of the basic acrylamides in an aqueous suspension or solution at a pH below 7, and preferably at a pH between about 3 and 5.

Shaped articles may be formed from solutions of the above-mentioned copolymers by extruding the solutions into suitable coagulating media, e. g., evaporative atmospheres or liquid coagulating baths. The shaped articles such as filamentary materials produced in this manner may then be treated to remove the residual solvent, and thereafter, stretched and heat treated so as to produce oriented products having high tenacity, high elastic recovery, low shrinkage, etc., and which possess a very high affinity for acid dyestuffs.

This invention will be more fully described by the following examples, although, it is understood that the invention is not intended to be limited by these examples. In these examples "parts" and "percent" of materials is intended to mean parts and percent by weight.

*Example I*

To a stirred solution of 1500 parts distilled water, 5.4 parts potassium persulfate and 4.8 parts sodium hydrosulfite at about 62° C. in an atmosphere of nitrogen, there was added as rapidly as possible 70.4 parts of 1 N sulfuric acid followed by a mixture of 190 parts acrylonitrile and 10 parts of dimethylaminoethyl acrylamide.

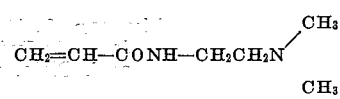

The temperature was maintained at about 68–70° C. for three hours during which time an additional 2 parts of potassium persulfate was added. The mixture was then allowed to cool and stand for about 18 hours at room temperature. The white powdery copolymer was filtered off, washed and dried in an oven at about 65° C. for 18 hours. The yield of copolymer was 181 parts and its molecular weight was about 47,000.

The dried copolymer prepared as above was dissolved at about 95° C. in ethylene carbonate to form a solution containing about 20% by weight of the copolymer. This solution after filtering and deaerating in vacuo, was heated to 120° C. and extruded through a spinneret having 40 holes (.003 inch diameter) into a coagulating bath consisting of about 80 parts by weight of triethylene glycol and 20 parts ethylene carbonate. The bath temperature was maintained at about 130° C. while the coagulated filaments were drawn through the bath for 30 inches of bath travel and then collected on a bobbin driven at a peripheral speed of about 44 meters per minute. The yarn was washed with water at room temperature and then led through a steam chamber maintained at 145° C. and from there to a collecting device driven at a peripheral speed of 440 meters per minute so as to impart a ten-fold stretch. The stretched yarn was then passed over an internally-heated roll maintained at about 160° C. and relaxed to the extent of 14% of its length. The yarn thus obtained was about 90–100 denier and was white, lustrous and strong; showing, in general, a tenacity of about 4 to 4.5 grams per denier, and an elongation of about 16 to 18% at break.

This yarn was then dyed a deep orange by boiling for thirty minutes in an aqueous dye-bath containing 0.2% to 2% of sulfuric acid and 0.2% to 5% of the dyestuff known as "Orange Y Conc." (Color Index No. 151). The dyed yarn thus obtained was then washed and boiled with soapy water to remove any unabsorbed dye. After drying, the yarn was found to be evenly and intensely dyed and was fast to laundering. In contrast to the above, a sample of yarn prepared in a similar manner, but solely from polyacrylonitrile without any copolymerized dimethylaminoethyl acrylamide, could not be dyed under the same conditions.

The dimethylaminoethyl acrylamide used above as the comonomer is a colorless liquid (B. P. 110–112° C. at 5 mm.; $n_D^{28}$ 1.4900). It may be prepared by reacting molecular equivalent proportions of beta-propiolactone and

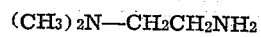

to form HOCH$_2$CH$_2$CONH—CH$_2$CH$_2$N(CH$_3$)$_2$ and distilling this reaction product in vacuo. It readily polymerizes with itself to form a high molecular weight homopolymer which is soluble in dilute acids.

Example II

To a stirred solution of 1200 parts distilled water and 54.4 parts of 1 N sulfuric acid in an atmosphere of nitrogen at about 61° C., there was added rapidly in the order named, 3.5 parts potassium persulfate, 1.48 parts sodium bisulfite, and a mixture of 190 parts acrylonitrile and 10 parts N-morpholinoethyl acrylamide.

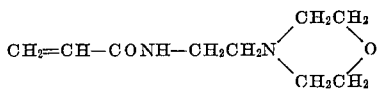

The stirred mixture was maintained at about 60-64° C. for three hours during which time an additional 1 part of potassium persulfate and 0.5 part of sodium bisulfite were added. The powdery white copolymer was then filtered off, washed and dried. The yield of copolymer was about 190 parts and its molecular weight was approximately 40,000. This copolymer can be dissolved in an appropriate solvent such as, for example, ethylene carbonate, and spun to form strong, substantially white fibers that have an affinity for acid dyestuffs.

The N-morpholinoethyl acrylamide used above as the comonomer was prepared by reacting acrylyl chloride with morpholinoethyl amine, neutralizing the salt formed with caustic soda, extracting with ether and distilling the extract in vacuo. It boiled at 121-124° C./.05 mm. and solidified to a crystalline solid. It had a melting point of about 112-113° C. when recrystallized from nitroethane.

Example III

A copolymer was prepared by the procedure of Example II, using 190 parts of acrylonitrile and 10 parts of

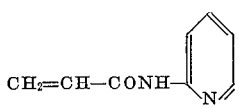

the latter being prepared from acrylyl chloride and 2-aminopyridine. The yield of white powdery copolymer was 180 parts. It had a molecular weight of about 50,000 and could be spun into fibers having enhanced affinity for acid dyes.

As previously stated, the proportion of acrylonitrile in the new copolymers should be at least about 85% by weight and advantageously, at least about 90% by weight. Minor proportions (up to a total of about 10% by weight) of one or more other vinyl compounds can be copolymerized with the above monomers if desired, to yield tripolymers or tetrapolymers. Among such other monomers may be mentioned, for example: vinyl esters (vinyl acetate, vinyl formate, vinyl benzoate), vinyl ethers, and vinyl ketones; acrylic acid and its esters and amides; methacrylic acid and its esters, amides, and nitrile; maleic, itaconic, fumaric, crotonic acids and their esters, amides and nitriles; allyl alcohol and its esters and ethers; styrene and nuclear substituted styrenes, e. g. chloro- and dichloro styrene; halogenated monoethylenic compounds such as vinyl chloride, vinyl fluoride, and vinylidene chloride; N-vinyl compounds such as N-vinyl pyrrolidone, N-vinyl succinimide, N-vinyl carbazole, 2- and 4-vinylpyridines; and the like.

The copolymers of this invention may be prepared by any suitable polymerization method such as, for example, polymerization with oxygen-yielding catalysts, e. g., benzoyl peroxide, potassium or ammonium persulfate, etc. Redox polymerization systems employing oxygen-yielding catalysts such as the above in combination with reducing agents such as sodium bisulfite, sodium hydrosulfite, etc., may be used with advantage.

The molecular weights of these polymers and copolymers are preferably within the range of 10,000 and 250,000, or even higher, although polymers having molecular weights between 40,000 and 150,000 may be used with particular advantage in the production of fibers.

In the production of fibers from the copolymers of the invention, it is necessary to prepare solutions thereof for extrusion into suitable coagulating media, i. e., evaporative or coagulating atmospheres, liquid coagulating baths, etc. In general, these spinning solutions may be prepared by heating the finely divided copolymers in the presence of a suitable solvent at temperatures between about 50-100° C. or higher depending upon the particular solvent being employed. Typical preferred solvents which may be used are various organic solvents such as N,N-dimethyl formamide, or N,N-dimethyl acetamide; or the non-nitrogen-containing solvents such as the lactones, e. g. gamma-valerolactone, gamma-butyrolactone, etc., or the cyclic carbonates, e. g. ethylene carbonate, etc. With advantage, particularly in the production of fibers, the heated mixtures of polymer and solvent are maintained in inert or oxygen-free atmospheres to minimize discoloration. These spinning solutions may have a solids content between about 15% and 30% solids depending upon the molecular weight of the polymer, and preferably between about 18% and 25%.

For various purposes it may be desirable to chemically and physically modify these polymer solutions by the presence of other materials such as, for example, pigments, plasticizers, stabilizers, spinning agents, etc.

Among the suitable liquid coagulants which may be employed with advantage with spinning solutions such as ethylene carbonate-type spinning solutions, may be mentioned glycol baths such as ethylene glycol, diethylene glycol, triethylene glycol, tetraethylene glycol, propylene glycol, dipropylene glycol, and tripropylene glycol. In general, the temperature of the ethylene carbonate-type spinning solutions at extrusion may be maintained between about 80-150° C., and the glycol coagulant at temperatures between about 50-150° C., or if desired, at a higher temperature such as, for example, up to about 175° C.

The freshly extruded and coagulated material thereafter, with advantage may be washed with an aqueous medium such as water and the washed fibers subsequently stretched up to 600-1000 percent or more. Such stretching may be accomplished in secondary baths containing materials similar to those of the coagulating medium employed, or if desired, other heated media may be employed such as, for example, inert liquids, vapors or gases, e. g., steam.

The washed and stretched products may be heat treated while in a relaxed condition at temperatures between about 100° and 180° C. to improve their physical properties.

I claim:

1. As a new composition of matter, a copolymer derived by the polymerization of a mixture comprising acrylonitrile and a water-soluble sulfuric acid salt of N-morpholinoethyl acrylamide; said copolymer containing in the polymer molecule at least about 85% by weight of acrylonitrile and between about 2% and 10% by weight of said acrylamide compound.

2. A molecularly oriented fiber which exhibits characteristic crystalline X-ray diffraction patterns comprising the copolymer as defined in claim 1.

HERMAN A. BRUSON.

References Cited in the file of this patent

UNITED STATES PATENTS

| Number | Name | Date |
|---|---|---|
| 2,478,378 | Dickey | Aug. 9, 1949 |
| 2,560,680 | Allewelt | July 17, 1951 |